(12) United States Patent
Forster

(10) Patent No.: US 12,086,667 B2
(45) Date of Patent: Sep. 10, 2024

(54) WIRELESS COMMUNICATION DEVICE HAVING A STIFFNESS ALTERING STRUCTURE

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 150 days.

(21) Appl. No.: 17/758,039

(22) PCT Filed: Dec. 28, 2020

(86) PCT No.: PCT/US2020/067215
§ 371 (c)(1),
(2) Date: Jun. 27, 2022

(87) PCT Pub. No.: WO2021/134076
PCT Pub. Date: Jul. 1, 2021

(65) Prior Publication Data
US 2023/0056643 A1  Feb. 23, 2023

Related U.S. Application Data

(60) Provisional application No. 62/954,480, filed on Dec. 28, 2019.

(51) Int. Cl.
*G06K 19/04* (2006.01)
*G06K 19/02* (2006.01)
(Continued)

(52) U.S. Cl.
CPC ..... *G06K 19/045* (2013.01); *G06K 19/07749* (2013.01); *G06K 19/027* (2013.01); *G06K 19/041* (2013.01); *H01Q 1/273* (2013.01)

(58) Field of Classification Search
CPC .......... G06K 19/045; G06K 19/07749; G06K 19/027; G06K 19/041; H01Q 1/273
See application file for complete search history.

(56) References Cited

U.S. PATENT DOCUMENTS

| 7,259,678 B2 | 8/2007 | Brown et al. |
| 9,064,199 B2 | 6/2015 | Nitta |

(Continued)

FOREIGN PATENT DOCUMENTS

| AU | 2015271941 | 6/2017 |
| EP | 2772873 | 12/2019 |

(Continued)

OTHER PUBLICATIONS

International Search Report and Written Opinion dated Mar. 17, 2021 issued in corresponding IA No. PCT/US2020/067215 filed Dec. 28, 2020.

(Continued)

*Primary Examiner* — Curtis A Kuntz
*Assistant Examiner* — James E Munion

(57) ABSTRACT

In some embodiments, a radio frequency identification (RFID) device may include a reactive strap may include a conductor enclosing an area and an RFID chip connected to the conductor, the conductor enclosing an area and defining a first opening, and a flexible substrate attached to the conductor and defining a second opening. The first and second openings together may define a passage through both the conductor and the flexible backing material.

15 Claims, 3 Drawing Sheets

(51) Int. Cl.
    *G06K 19/077*     (2006.01)
    *H01Q 1/27*     (2006.01)

(56) References Cited

U.S. PATENT DOCUMENTS

| | | | |
|---|---|---|---|
| 9,159,015 B2* | 10/2015 | Bielmann | G06K 19/027 |
| 10,956,805 B2* | 3/2021 | Kato | H01Q 1/273 |
| 10,984,642 B2* | 4/2021 | Forster | G08B 13/2417 |
| 11,010,653 B2* | 5/2021 | Pheil | H04B 5/77 |
| 2009/0100575 A1 | 4/2009 | Darnborough | |
| 2010/0079286 A1* | 4/2010 | Phaneuf | G06K 19/07749 |
| | | | 340/572.1 |
| 2014/0209690 A1* | 7/2014 | Teng | G06K 19/07786 |
| | | | 235/492 |
| 2014/0326791 A1* | 11/2014 | Ishida | G06K 19/0723 |
| | | | 29/25.01 |
| 2018/0157953 A1 | 6/2018 | Forster | |

FOREIGN PATENT DOCUMENTS

| | | | |
|---|---|---|---|
| EP | 2657889 | 5/2020 | |
| JP | 2011-015395 | 1/2011 | |
| JP | 2013-089022 | 5/2013 | |
| WO | 2017/135331 | 8/2017 | |
| WO | WO-2017135331 A1 * | 8/2017 | B42D 25/305 |

OTHER PUBLICATIONS

International Preliminary Report on Patentability dated Jun. 28, 2022 issued in corresponding IA No. PCT/US2020/067215 filed Dec. 28, 2020.

\* cited by examiner

WIRELESS COMMUNICATION DEVICE HAVING A STIFFNESS ALTERING STRUCTURE

CROSS-REFERENCE TO RELATED APPLICATION

The present application is a 371 of International Application No. PCT/US2020/067215, which was published in English on Jul. 1, 2021, and claims the benefit of U.S. Provisional Patent Application No. 62/954,480 filed Dec. 28, 2019, both of which are incorporated herein by reference in their entireties.

BACKGROUND

Devices incorporating wireless communication approaches including RFID technology are widely used for a variety of different applications, including incorporation into merchandise labels or tags for tracking, and security purposes. Such systems are well known in the retail industry, including in connection with items, such as clothing, for inventory control and security from theft and other losses.

RFID devices incorporated into a merchandise label or tag may have a variety of integrated components, among them an RFID chip containing data such as an identification code for the type of product and even for the exact article associated with a unique identification code. Other components may include an antenna electrically connected to the RFID chip, which is responsible for transmitting signals to and/or receiving signals from another RFID device, for example, an RFID reader system.

Clothing labels or tags move with the articles of clothing to which they are attached. Such labels or tags may impact comfort and frequently are subjected to stress, such as when the associated article of clothing is washed, folded or otherwise handled. Labels or tags incorporating a wireless communication RFID device that are associated with articles of clothing can be stiff, causing discomfort or risking damage to the communication device when the label is bent. Also, additional expense is incurred when having to construct a separate label or tag that must then be sewn or otherwise attached to an article.

Accordingly, improvements may be made over existing wireless communication devices with respect to comfort and/or durability.

SUMMARY

There are several aspects of the present subject matter which may be embodied separately or together in the wireless communication devices and systems described and claimed herein. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In some embodiments, an RFID device may include a reactive strap may include a conductor enclosing an area and a radio frequency identification (RFID) chip connected to the conductor, the conductor enclosing an area and defining a first opening, and a flexible substrate attached to the conductor and defining a second opening. The first and second openings together may define a passage through both the conductor and the flexible backing material.

In some embodiments, the RFID device may include an antenna configured for reactively coupling with the reactive strap. The conductor may have a shape that may include at least one of a ring shape, a square shape, a rectangular shape, a semi-circle. The flexible substrate may include at least one of fabric, polyethylene terephthalate (PET), or other flexible plastic material. The conductor further may include copper wire, etched copper, printed conductive ink or other flexible conductive material. The reactive strap may be laminated to the flexible substrate using a flexible material to seal the reactive strap from an external environment. The RFID device may include a flexible article, and the reactive strap may be secured to the flexible article by at least one stitch extending from a position outside of the flexible substrate to a position within the opening of the flexible substrate.

In some embodiments, the stitch may not be directly attached to the flexible substrate. The antenna may include one or more crossing sections that cross the conductor. The one or more crossing sections of the antenna may secure the reactive strap to the flexible article by extending over the conductor. More than 60% of the reactive coupling of the antenna to the reactive strap may be based on the proximity of the antenna to the conductor rather than on the one or more crossing sections. More than 60% of the reactive coupling of the antenna to the reactive strap may be based on crossing of parts of the antenna rather than on the proximity of non-crossing sections of the antenna to the conductor. The one or more crossing sections may wrap around the conductor to influence coupling of the antenna to the reactive strap.

In some embodiments, the one or more crossing sections may include more than 10 crossings of the crossing section over the same side of the conductor. The pattern may include the wire of the antenna extending over the conductor at selected locations each having multiple crossings of the wire over the conductor. The antenna crosses the conductor at a plurality of locations that are separated by at least 20 degrees as measured from a centroid of the area enclosed by the conductor. The flexible substrate may be generally annular and substantially concentric with the conductor. The stitch may be formed using a part of the antenna.

In some embodiments, a method of forming an RFID device may include attaching a reactive strap to a flexible substrate, the reactive strap may include a conductor enclosing an area and a radio frequency identification (RFID) chip connected to the conductor, the conductor enclosing an area and defining a first opening, and the flexible substrate being attached to the conductor and defining a second opening. The first and second openings may together define a passage through both the conductor and the flexible backing material. The method may include coupling an antenna to the reactive strap directly or through one or more other objects. The method may include securing the reactive strap to the flexible article using at least one stitch extending from a position outside of the flexible substrate to a position within the opening of the flexible substrate. The stitch may be formed using a part of the antenna.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
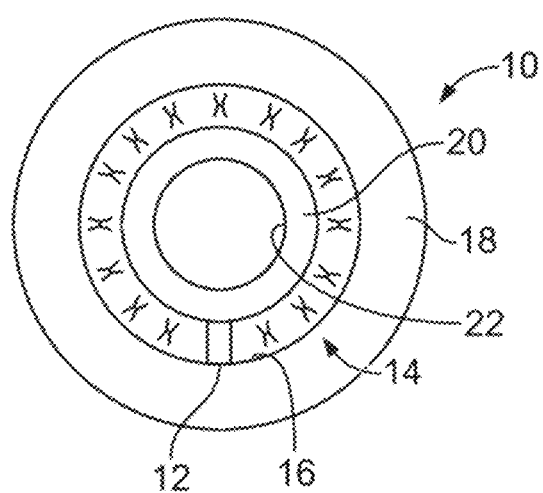
FIG. 1 is a schematic view of a wireless communication device including a reactive strap having an RFID chip and a conductor according to some embodiments.

In various embodiments, such as in FIG. 1, an exemplary wireless communication device 10 that may be suitable for attachment to a flexible article (e.g., a fabric article or a label associated with a fabric article) may include various components while providing enhanced flexibility. In addition to the components shown in FIG. 1, the wireless communication device 10 may further include an antenna, such as a copper wire antenna, which is not illustrated in FIG. 1.

In various embodiments, the wireless communication device 10 may include an RFID chip 12 forming a portion of a reactive strap 14 that further includes a ring-shaped conductor 16 connected to the RFID chip 12. In various embodiments, the conductor 16 may have various shapes that enclose an area such as loops, spirals, semi-circles, squares, rectangles, triangles, hexagons, octagons, dodecagons, stars, and others.

In various embodiments, the reactive strap 14 may be disposed on a flexible backing material or substrate 18. The substrate 18 may define one or more openings, such as a second opening 22 that defines a part of a passage that extends through the substrate.

In various embodiments, the conductor 16 may be formed using a flexible material and may have a center that does not include a conductor. In various embodiments, the center may be an opening defined by the conductor 16 or may be formed from another material. In various embodiments, the conductor 16 encloses an area and defines one or more first openings 20. The first openings 20 may define another part of the passage that extends through the substrate 18 and the conductor 16.

In various embodiments, the substrate 18 may be constructed of various materials including fabric of various types, polyethylene terephthalate (PET), rubber, paper, carbon fiber, or a flexible plastic material. The conductor 16 also may be constructed of various conductive materials including copper wire, etched copper, aluminum, printed conductive ink or other flexible and/or non-flexible conductive materials.

In various embodiments, the wireless communication device 10 may be constructed in various ways, depending on the intended use and exposure to which the wireless communication device 10 will be subjected. Frequently, the flexible article to which the wireless communication device 10 will be attached may be intended to be worn against a user's skin, such that enhanced flexibility is desired. To increase the flexibility of the substrate 18, a portion of the substrate 18 in the region of the center of the conductor 16 may be removed or omitted (e.g., the second opening 22). Thus, the conductor 16 may define a hollow shape (e.g., may have one or more first openings 20) and may coincide or at least be substantially concentric with a hole or second opening 22 defined in the substrate 18 of the flexible reactive strap 14, such as is shown in FIG. 1.

Given that the flexible article to which the wireless communication device 10 is to be attached may be subjected to washings, moisture, and/or bending (particularly if the flexible article is an article of clothing or a label of an article of clothing), the reactive strap 14 may be laminated to the substrate 18 using thermoplastic polyurethane (TPU) or other flexible material. The external laminating layers may allow the reactive strap 14 to be flexible and environmentally sealed. The flexible material used to protect the reactive strap 14 by lamination may be of the same or different material as that which is used for the substrate 18, and is omitted from FIG. 1 for better viewing of other components of the wireless communication device 10. In some embodiments, the diameter of the area enclosed by the conductor 16 may be between 0-0.2 cm, 0.2-0.4 cm, 0.4-0.6 cm, 0.6-0.8 cm, 0.8-1.0 cm, 1.0-1.3 cm, and 1.3-1.6 cm. In some embodiments, the width of the conductor may be between 5-15 microns, 15-30 microns, 30-60 microns, 60-200 microns, 200-500 microns, 500-800 microns, 800-1200 microns, 1.2-1.5 mm, or greater.

Figure 2:
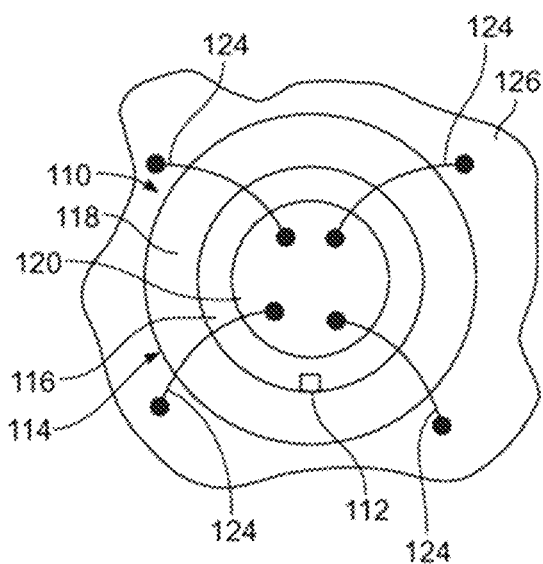
FIG. 2 is a schematic view of a wireless communication device secured by a stitch according to some embodiments.

In some embodiments, such as in FIG. 2, a wireless communication device 110 includes an RFID chip 112 of a reactive strap 114 that further includes a conductor 116 (e.g., a ring-shaped conductor), with the reactive strap 114 being disposed on a flexible substrate 118 (e.g., a backing material), as in FIG. 1. The conductor 116 may be generally annular, having a first opening 120 (e.g., an open center), thereby allowing a stitch 124 to pass over the conductor 116 from a radially outward position to a position within its first opening 120 (e.g., a first opening). In some embodiments, such as in FIG. 2, the substrate 118 may have lack an opening such as the second opening 22, and may have a covered portion that covers part or all of one side of the first opening 120 (e.g., a center opening). If the flexible substrate 118 of this second example includes an opening (as in FIG. 1), the stitch 124 may pass through the opening of the flexible substrate 118. The substrate 118 may be attached to a first face of an article 126, or in some embodiments, the substrate 118 may be an article 126. In various embodiments, the article 126 may be a clothing article such as a shirt, jacket, pants, shorts, underwear, shoe, slipper, sandal, wristband, belt, shoulder strap, scarf, or a hat.

In various embodiments, the stitch 124 may include one or more of a thread, wire, string, strap, or other structure made out of fabric, metal, plastic, rubber, or other materials. The stitch 124 may be bonded at one or both ends to one of the article 126, the substrate 118, or the conductor 116. The bonding may be performed using an adhesive, by melting and cooling part of the stitch 124, using a fastener such as a staple or clamp, or by passing the stitch 124 through the connected material and/or by tying a knot or using another obstruction to prevent the stitch from being pulled through the connected material.

One or more stitches 124 may extend from a first side of the article 126 from a location outside of the outer diameter of the conductor 116, extend over the conductor 116, and may reach down and through the first opening 120 to attach a second end to the first side of the article 126 that may be exposed through the first opening 120. In various embodiments, the first end and/or the second end of the one or more stitches 124 may be attached to the first or second side of the article 126. In various embodiments, one or more of the stitches 124 may be formed as a loop, an arch, or another configuration to retain the conductor 116 in a fixed position or movably within a limited range of positions.

In various embodiments, the stitch 124 may pass from a position radially outwardly of the flexible substrate 118, over the conductor 116, to a position within an opening defined in the flexible substrate 118, without penetrating the flexible substrate 118. This may be particularly advantageous if the reactive strap 114 is laminated to the flexible substrate 118 to preserve the seal of the reactive strap 114 from the outside environment. A generally annular, relatively narrow flexible substrate 118, as shown in FIG. 2, may be preferred for such an approach to securing the wireless communication device 110 to the flexible article 126, but other configurations may also be employed without departing from the scope of the present disclosure. In any event, regardless of whether one or more stitches 124 penetrate the flexible substrate 118, the wireless communication device 110 may be sewn directly to the flexible article 126.

Figure 3:
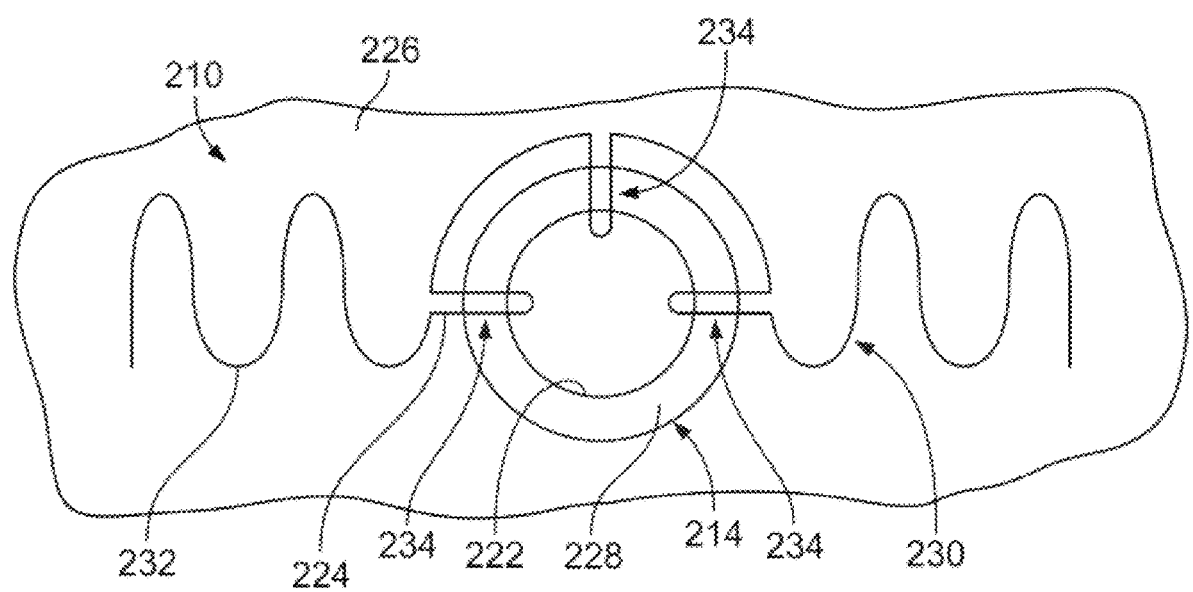
FIGS. 3-5 are schematic views of wireless communication devices according to some embodiments.

In various embodiments, such as in FIG. 3, a wireless communication device 210 may be sewn or otherwise attached to a flexible article 226, such as with or without a substrate. For example, the substrate may be made of and/or coated with a conductive material, and may have sufficient durability to withstand being worn, used as part of apparel, and/or washed.

In various embodiments, the wireless communication device 210 may include a reactive strap 214 comprising an RFID chip connected to a conductor that may or may not be disposed on a substrate 228, as in FIGS. 1 and 2. The substrate 228 (e.g., a flexible backing material) and/or conductor may define a first opening 222, which may accommodate one or more stitches 224, as shown in FIG. 3, to secure the wireless communication device 210 to the flexible article 226.

In some embodiments, as seen in FIG. 3, an antenna 230 of the wireless communication device 210 may include a wire 232, with the wire 232 of the antenna 230 being used for some or all of the stitching 224 that extends over the reactive strap 214. The stitching 224 may also pass through the first opening 222 in the substrate 228, as described above. Thus, wire 232 of the antenna 230 may extend from the outside to the inside (relatively speaking) over the conductor at one or more selected crossing locations 234 to secure and/or retain the wireless communication device 210, the conductor, and/or the substrate 228 in place relative to the article 226 with or without penetrating the substrate 228. For example, a part of the wire 232 may be attached to a first face of the article 226 at a location outside the outer perimeter of the conductor and/or substrate 228, extend over the conductor and/or substrate 228, attach to a first face of the article 226 at a location inside the inner perimeter of the conductor and/or substrate 228, extend back over the conductor and/or substrate 228, and extend next to the conductor and/or substrate 228. In various embodiments, the communication device 210 may include 1, 2, 3, 4, 5, or between 5-10, 10-15, or 20-40 connections. In some embodiments, the width of the wire may be between 5-15 microns, 15-30 microns, 30-60 microns, 60-200 microns, 200-500 microns, 500-800 microns, 800-1200 microns, 1.2-1.5 mm, or greater.

In various embodiments, by extending across the conductor with minimal crossing 234 of the wire 232 over the conductor, in a manner seeking to minimize the coupling between the antenna 230 and the reactive strap 214. This may be achieved, for example, by including a single stitch 224 crossing and crossing immediately back over the conductor, such that coupling of the antenna 230 to the reactive strap 214 is based primarily on the proximity of the antenna 230 to the reactive strap 214. Thus, the minimal crossing locations 234 may have limited impact on the coupling of the antenna 230 to the reactive strap 214.

In various embodiments, the wire 232 may extend next to and/or parallel to an outer perimeter of a portion of the conductor of FIG. 3. The portion may be between 0-10%, 10-20%, 20-30%, 30-40%, 40-50%, 50-60%, 70-80%, or 90-100% of the conductor. The wire 232 may be disposed to reactively couple the antenna with the conductor.

Figure 4:
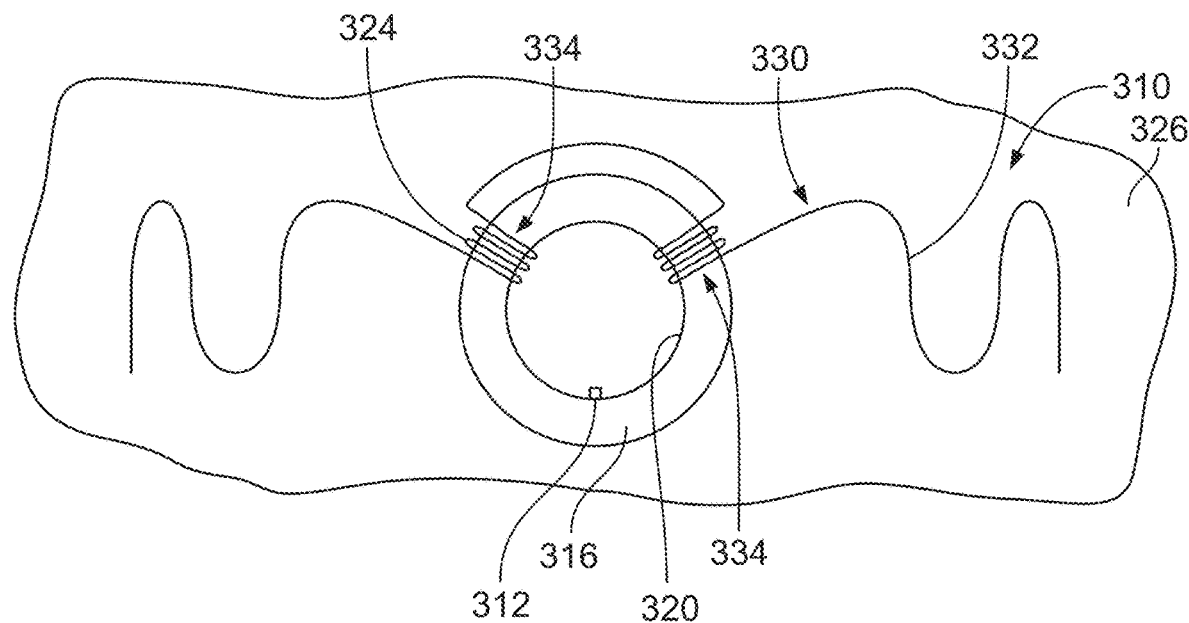

In various embodiments, such as FIG. 4, a wireless communication device 310 may have additional configurations. The reactive strap includes an RFID chip 312 and a conductor and/or substrate 316. As in the other embodiments described herein, the conductor and/or substrate 316 may define an opening 320.

In some embodiments, the antenna 330 includes a wire 332 that is used to secure the wireless communication device 310, its conductor and/or the substrate 316 to the flexible article 326, similar to the embodiment of FIG. 3. In contrast to the embodiment of FIG. 3, in which the wire 232 of the antenna 230 crosses the conductor and/or substrate 316 to minimize the influence of the wire 232 on the coupling between the reactive strap 214 and the antenna 230, one or more of the locations at which the wire 332 of FIG. 4 crosses the conductor and/or substrate 316 using multiple crossings of the wire 332 over the conductor and/or substrate 316 at one or more of the locations 334. This provides an example wherein wire 332 of the antenna 330 that is sewn over the flexible ring-shaped conductor 316 more greatly influences coupling of the wire antenna 330 to the reactive strap. In various embodiments, between 0-10%, 10-20%, 20-30%, 30-40%, 40-50%, 50-60%, 60-70%, 70-80%, 80-90%, or 90-100% of the coupling effect between the antenna 330 and the conductor 316 may be caused by the wire crossings, with the remaining effect being caused by the non-crossing parts of the wire 332. In various embodiments, between 0-2%, 2-4%, 5-6%, 6-8%, 8-10%, 10-12%, 12-14%, 14-16%, 16-18%, 18-20%, 20-30%, 30-40%, 40-50%, 50-60%, 60-70%, 70-80%, 80-90%, or 90-100% of a length of the antenna extends between a pair of crossing locations 334. In various embodiments, one or more locations 334 where one or more crossings occur may be separated by an angle of between 0-1, 1-2, 2-3, 3-4, 4-5, 5-6 6-7, 7-8, 8-9, 9-10, 10-15, 15-20, 20-25, 25-35, 35-65, 65-115, 115-175, 160-200 degrees, with the angle being defined by a first line starting from a center or centroid of the area enclosed by the conductor and ending at a centroid of a first contact location 334 and a second line starting from a center or centroid of the area enclosed by the conductor and ending at a centroid of a second contact location 334.

In various embodiments, the multiple crossings at each selected location 334 may be the basis for and may enhance the coupling of the antenna 330 to the reactive strap. Thus, the wire 332 may be sewn in a pattern that attaches the reactive strap and substrate 316 to the flexible article 326 and directly couples the reactive strap to the antenna 330 at locations where the wire 332 of the antenna 330 crosses the conductor of the reactive strap. For example, at each location 334, the wire 332 may cross the conductor and/or substrate 316 between 2-4, 4-6, 6-8, 8-10, 10-20, 20-40, 40-80, or more times. The wire 332 may cross back and/or forth over the same side of the conductor and/or substrate 316, or it may wrap around the conductor and/or substrate 316 to accomplish a crossing. In various embodiments, the wire 332 may directly contact the conductor and/or substrate 316 at one or more crossing locations with metal to metal (or other conductive materials) contacting each other. In some embodiments, the wire 332 may cross the conductor and/or substrate 316 at one or more crossing locations with an intervening non-conductive material between the wire 332 and the conductor and/or substrate 316.

Figure 5:
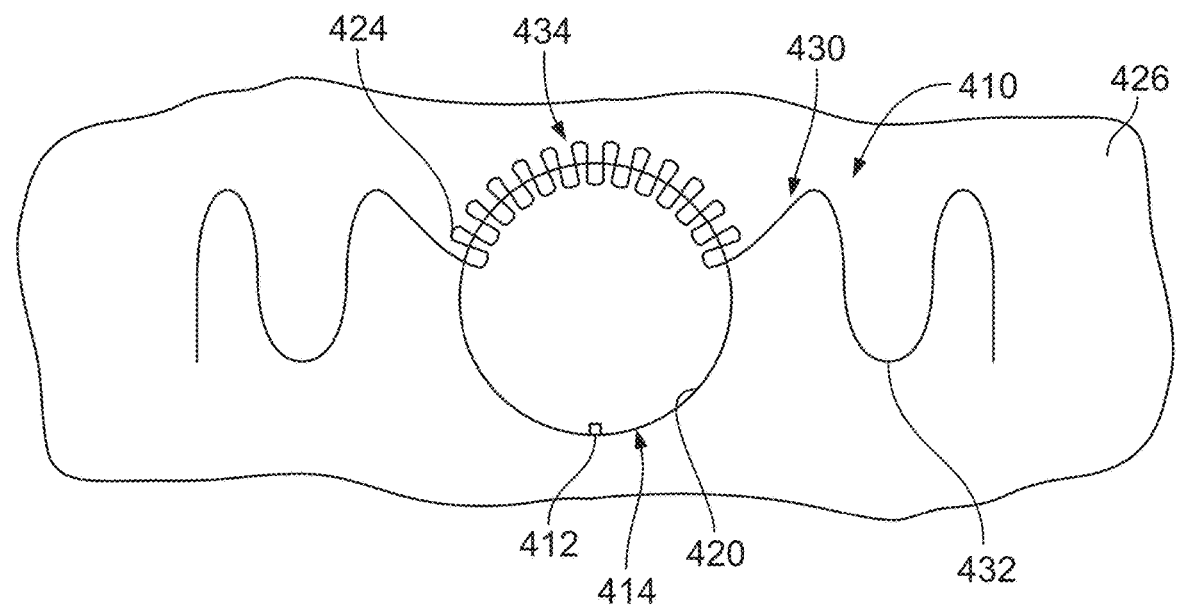

In some embodiments, such as in FIG. 5, the wireless communication device 410 may include the RFID chip 412 and a conductor 414. A substrate may or may not be used with the conductor 414, and the conductor 414 may define an opening 420.

In some embodiments, the antenna 430 includes a wire 432 of the antenna 430 that may be sewn or otherwise fixed in position over the conductor 414. For example, the wire 232 may be sewn to the flexible article 426 using a dense series of stiches 424 over the conductor, which may both secure the wireless communication device 410 to the flexible article 426 and couples the reactive strap to the antenna 430 in a way that alters the tuning of the wireless communication device 410. As a result, the wire 432 of the antenna 430 may be used to couple and change the resonant frequency of the reactive strap frequency to adapt the communication of the wireless communication device 410 as needed.

In various embodiments, a method of attaching a wireless communication device to a flexible article, may include forming a wireless communication device of the type described herein (with a reactive strap disposed on a flexible backing material defining an opening). The method also may include sewing the reactive strap 114 and flexible substrate 118 directly to a flexible article 126 by stitching 124 over the conductor 116 and through the first opening 120 of the conductor 116 using thread or wire.

The method additionally may include the step of forming the conductor 116 using copper wire, etched copper, printed conductive ink or other flexible conductive material, and the step of sewing may further include sewing from the outside to the inside (relatively speaking) over the conductor 116, optionally without penetrating the flexible substrate 118.

Such methods also may include, as shown in FIGS. 3-5, wherein the step of securing the wireless communication device further includes using wire of the antenna when sewing over the conductor to secure the wireless communication device to the flexible article. Consistent with the above description of, for example, FIGS. 4 and 5, the method of attaching a wireless communication device to a flexible article may include using wire of the antenna in sewing over the conductor in a way which more greatly influences coupling of the antenna to the reactive strap (e.g., via multiple crossings at selected locations, as in FIG. 4, or a dense pattern of stitches, as in FIG. 5).

The embodiments described above are illustrative of some of the applications of some of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An RFID device, comprising:
  a reactive strap comprising a conductor enclosing an area and a radio frequency identification (RFID) chip connected to the conductor, the enclosed area defining a first opening; and
  a flexible substrate attached to the conductor and comprising an inner perimeter defining a second opening,
  wherein the first and second openings together define a passage through both the conductor and the flexible substrate;
  wherein the RFID device further comprises a flexible article and an antenna, the antenna comprising a wire configured for reactively coupling with the reactive strap,
  wherein the reactive strap is secured to the flexible article by at least one stitch extending from a position outside of an outer perimeter of the flexible substrate over the conductor to a position within the second opening of the flexible substrate without penetrating the flexible substrate, wherein the at least one stitch is formed using the wire.

2. The RFID device of claim 1, wherein the conductor has a shape that includes at least one of a ring shape, a square shape, a rectangular shape, a semi-circle.

3. The RFID device of claim 1, wherein the flexible substrate comprises at least one of fabric, polyethylene terephthalate (PET), or other flexible plastic material.

4. The RFID device of claim 1, wherein the conductor further comprises copper wire, etched copper, printed conductive ink or other flexible conductive material.

5. The RFID device of claim 1, wherein the reactive strap is laminated to the flexible substrate using a flexible material to seal the reactive strap from an external environment.

6. The RFID device of claim 1, wherein the antenna comprises one or more crossing sections that cross the conductor.

7. The RFID device of claim 6, wherein more than 60% of the reactive coupling of the antenna to the reactive strap is based on the proximity of the antenna to the conductor rather than on the one or more crossing sections.

8. The RFID device of claim 6, wherein more than 60% of the reactive coupling of the antenna to the reactive strap is based on crossing of parts of the antenna rather than on the proximity of non-crossing sections of the antenna to the conductor.

9. The RFID device of claim 6, wherein the one or more crossing sections wrap around the conductor to influence coupling of the antenna to the reactive strap.

10. The RFID device of claim 6, wherein the one or more crossing sections includes more than 10 crossings of the crossing section over the same side of the conductor.

11. The RFID device of claim 6, wherein a pattern is formed from the wire of the antenna extending over the conductor at selected locations each having multiple crossings of the wire over the conductor.

12. The RFID device of claim 6, wherein the antenna crosses the conductor at a plurality of locations that are separated by at least 20 degrees as measured from a centroid of the area enclosed by the conductor.

13. The RFID device of claim 1, wherein the flexible substrate is generally annular and substantially concentric with the conductor.

14. A method of forming an RFID device, the method comprising:
  attaching a reactive strap to a flexible substrate, the reactive strap comprising a conductor enclosing an area and a radio frequency identification (RFID) chip connected to the conductor, the enclosed area defining a first opening, and the flexible substrate being attached to the conductor and comprising an inner perimeter defining a second opening,
  wherein the first and second openings together define a passage through both the conductor and the flexible substrate, wherein the RFID device further comprises a flexible article and an antenna, the antenna comprising a wire configured for reactively coupling with the reactive strap, wherein the reactive strap is secured to the flexible article by at least one stitch extending from a position outside of an outer perimeter of the flexible substrate over the conductor to a position within the second opening of the flexible substrate without penetrating the flexible substrate, wherein the at least one stitch is formed using the wire.

15. The method of claim 14, further comprising coupling an antenna to the reactive strap directly or through one or more other objects.

\* \* \* \* \*